US009397829B2

(12) United States Patent
Iwashita et al.

(10) Patent No.: US 9,397,829 B2
(45) Date of Patent: *Jul. 19, 2016

(54) ELECTRONIC KEY REGISTRATION METHOD AND ELECTRONIC KEY REGISTRATION SYSTEM

(71) Applicant: KABUSHIKI KAISHA TOKAI RIKA DENKI SEISAKUSHO, Aichi (JP)

(72) Inventors: Hiroaki Iwashita, Aichi (JP); Hideki Kawai, Aichi (JP); Tetsuya Egawa, Aichi (JP); Masaki Hayashi, Aichi (JP); Toshihiro Nagae, Aichi (JP); Daisuke Kawamura, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 70 days.

This patent is subject to a terminal disclaimer.

(21) Appl. No.: 14/374,126

(22) PCT Filed: Jan. 18, 2013

(86) PCT No.: PCT/JP2013/050916
§ 371 (c)(1),
(2) Date: Jul. 23, 2014

(87) PCT Pub. No.: WO2013/114972
PCT Pub. Date: Aug. 8, 2013

(65) Prior Publication Data
US 2015/0010145 A1   Jan. 8, 2015

(30) Foreign Application Priority Data
Jan. 31, 2012   (JP) .................................. 2012-018436

(51) Int. Cl.
*H04L 9/08* (2006.01)
*G06F 21/44* (2013.01)
(Continued)

(52) U.S. Cl.
CPC .............. *H04L 9/0861* (2013.01); *B60R 25/24* (2013.01); *G06F 21/44* (2013.01); *H04L 9/0897* (2013.01);
(Continued)

(58) Field of Classification Search
CPC ..... G06F 21/44; H04L 9/0816; H04L 9/0866; H04L 9/0869
See application file for complete search history.

(56) References Cited

U.S. PATENT DOCUMENTS

| 5,615,649 A | * | 4/1997 | Yung | ...................... B60R 25/20 |
| | | | | 123/146.5 B |
| 6,204,570 B1 | * | 3/2001 | Muller | .................... B60R 25/24 |
| | | | | 180/287 |

(Continued)

FOREIGN PATENT DOCUMENTS

| DE | 44 41 415 A1 | 5/1996 |
| EP | 0 846 821 A2 | 6/1998 |

(Continued)

OTHER PUBLICATIONS

Search report from International Patent Appl. No. PCT/JP2013/050916, mail date is Mar. 5, 2013.

(Continued)

*Primary Examiner* — Dede Zecher
*Assistant Examiner* — Jason C Chiang
(74) *Attorney, Agent, or Firm* — Greenblum & Bernstein, P.L.C.

(57) ABSTRACT

A method for registering first and second electronic keys, which are capable of controlling a communication subject, to a controller of the communication subject, wherein the first electronic key is to be initially registered, and the second electronic key is to be additionally registered, the method including: performing an additional key production process including storing, in the second electronic key, an additional encryption key generation code unique to the second electronic key and an additional encryption key that is used to verify the second electronic key; and performing a key additional registration process including obtaining the additional encryption key generation code from the second electronic key when identification information unique to the communication subject is stored in the second electronic key, generating the additional encryption key with an additional encryption key generation logic, and storing the additional encryption key in the controller.

12 Claims, 8 Drawing Sheets

(51) Int. Cl.
*H04L 9/32* (2006.01)
*B60R 25/24* (2013.01)
*G07C 9/00* (2006.01)

(52) U.S. Cl.
CPC .......... *H04L 9/3271* (2013.01); *G07C 9/00857* (2013.01); *H04L 9/0816* (2013.01); *H04L 9/0866* (2013.01); *H04L 9/0869* (2013.01); *H04L 2209/84* (2013.01)

(56) References Cited

U.S. PATENT DOCUMENTS

| | | | |
|---|---|---|---|
| 6,847,286 B1 | 1/2005 | Bartz | |
| 2003/0014649 A1* | 1/2003 | Funahashi | G07C 9/00087 713/186 |
| 2005/0151619 A1* | 7/2005 | Forest | B60R 25/04 340/5.26 |
| 2006/0136702 A1* | 6/2006 | Vantalon | G06F 21/16 713/1 |
| 2008/0059806 A1* | 3/2008 | Kishida | G06F 21/35 713/186 |
| 2009/0323967 A1* | 12/2009 | Peirce | H04L 9/0869 380/278 |
| 2010/0174919 A1* | 7/2010 | Ito | G06F 21/554 713/192 |
| 2010/0220857 A1* | 9/2010 | Kawamura | H04L 9/0844 380/44 |
| 2011/0274273 A1* | 11/2011 | Fiske | G06F 21/32 380/46 |
| 2014/0016781 A1* | 1/2014 | Geiger | H04L 9/14 380/277 |

FOREIGN PATENT DOCUMENTS

| | | |
|---|---|---|
| JP | 10-299312 | 11/1998 |
| JP | 2001-323704 | 11/2001 |
| JP | 2009-302848 | 12/2009 |
| JP | 2010-206383 | 9/2010 |
| JP | 2010-228538 | 10/2010 |

OTHER PUBLICATIONS

International Preliminary Report for International Patent Appl. No. PCT/JP2013/050916, mail date is Aug. 5, 2014.
EPO Search Report mailed Jun. 22, 2015 in European Patent Application No. 13744359.4.

* cited by examiner

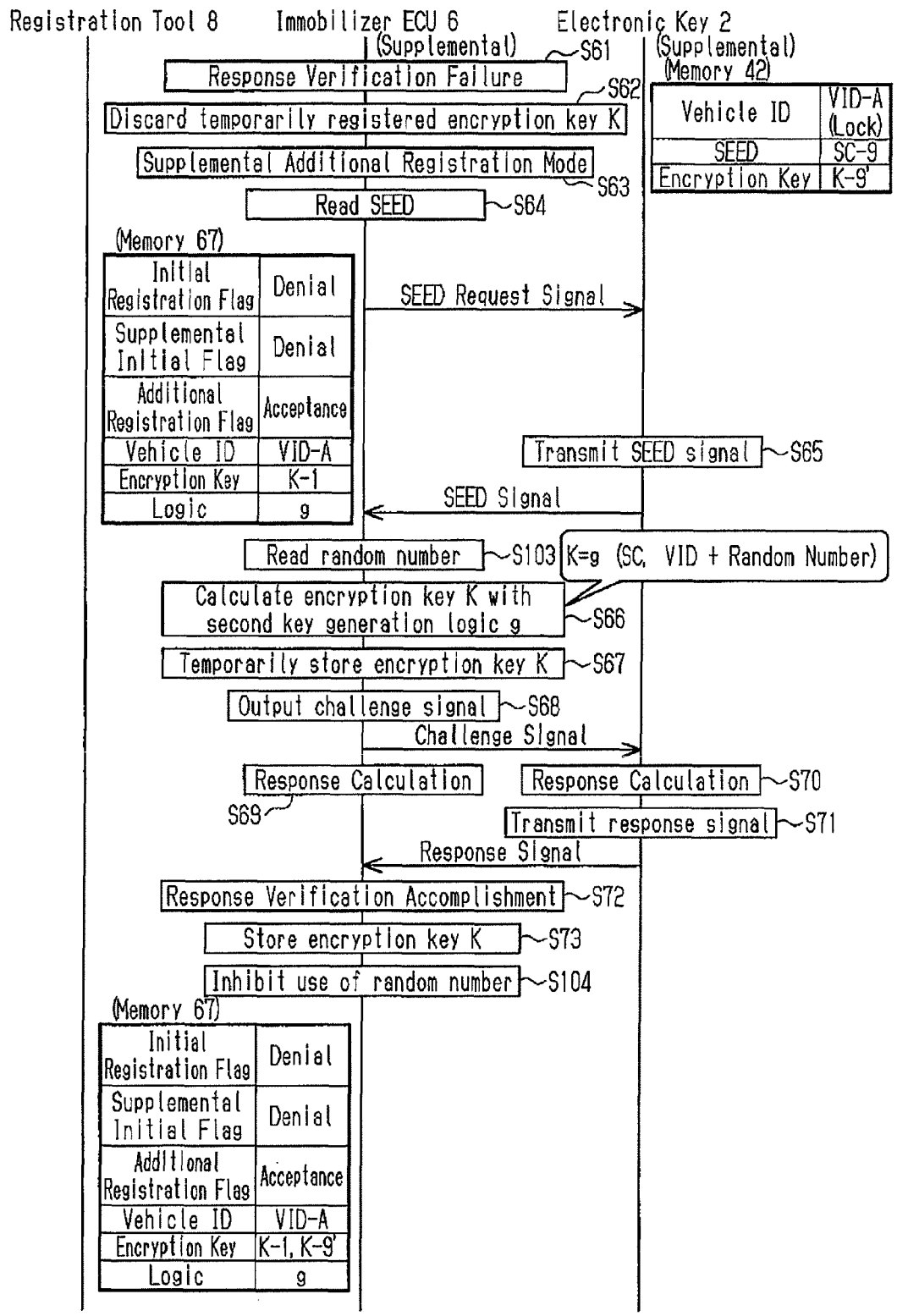

ELECTRONIC KEY REGISTRATION METHOD AND ELECTRONIC KEY REGISTRATION SYSTEM

TECHNICAL FIELD

The present invention relates to an electronic key registration method and an electronic key registration system that register an electronic key to a controller of a communication subject.

BACKGROUND ART

Conventionally, a known electronic key system performs radio communication between an electronic key, which a user of a vehicle carries, and the vehicle and performs the locking or unlocking of a vehicle door and the starting or stopping of the engine when verification of the electronic key is successful. In such electronic key systems, communication between the electronic key and the vehicle needs to be protected in order to ensure security. Thus, in the electronic key system, encrypted communication is performed between the electronic key and the vehicle (for example, refer to patent document 1). In the encrypted communication, contents of communication are encrypted to ensure high confidentiality.

As the above encrypted communication, the common key cryptosystem is employed. The common key cryptosystem uses the same encryption key for encryption and decryption. Thus, the electronic key and the vehicle need to have the same encryption key. The encryption key is registered to the electronic key and the vehicle when registering the electronic key to a controller of the vehicle. The controller authenticates the electronic key by verifying identification information that is transmitted through radio communication from the electronic key with identification information that is stored in the controller.

PRIOR ART DOCUMENT

Patent Document 1: Japanese Laid-Open Patent Publication No. 2009-302848

SUMMARY OF THE INVENTION

In an electronic key registration system that registers an electronic key to a controller, unless the controller is associated with the corresponding electronic key, any electronic key may be registered to the controller. This would allow for an electronic key other than the authentic electronic key to be registered to the controller. The inventors of the present application have considered shipping the controller and the electronic key from the factory after storing a vehicle ID in the controller and the electronic key. The vehicle ID is identification information unique to the vehicle (communication subject), to which the electronic key is registered. However, when the vehicle ID is tampered with, the controller would determine that an unauthentic electronic key is the authentic electronic key. Although the controller and the electronic key could be shipped together, this is complicated. Further, an electronic key cannot be additionally registered at a later date. This problem is not limited to electronic key systems used for vehicles. An electronic key system for use with a building such as a house has the same problem. Therefore, there is a need for an electronic key system that allows for easy registration of an electronic key while ensuring security.

Accordingly, it is an object of the present invention to provide an electronic key registration method and an electronic key registration system that allow for easy registration of an electronic key while ensuring security.

The first aspect is an electronic key registration method for registering a plurality of electronic keys, which are capable of controlling a communication subject, to a controller of the communication subject. The plurality of electronic keys include a first electronic key, which is initially registered, and a second electronic key, which is additionally registered. The method includes an additional key production step of storing, in the second electronic key, an additional encryption key generation code unique to the second electronic key and an additional encryption key that is used to verify the second electronic key, and a key additional registration step of obtaining the additional encryption key generation code from the second electronic key when identification information unique to the communication subject is stored in the second electronic key, generating the additional encryption key with an additional encryption key generation logic that uses the additional encryption key generation code and the identification information, and storing the additional encryption key in the controller.

Regarding the first aspect, in the key additional registration step, when the identification information unique to the communication subject is written to the second electronic key, the second electronic key is registerable to the controller. This restricts registration of the electronic key that does not store the identification information to the controller. In the additional key production step, the additional encryption key is generated with the additional encryption key generation logic and stored in the second electronic key. Also, in the key additional registration step, the additional encryption key is generated with the additional encryption key generation logic and stored in the controller. Thus, the controller verifies the second electronic key, which is produced to be additionally registered. This restricts additional registration of the initial registration electronic key to the controller. Accordingly, the electronic key 2 may easily be registered while ensuring security and eliminating the need to ship the electronic key 2 and the immobilizer ECU 6 together.

In the second aspect, the electronic key registration method further includes an initial production step of storing the identification information in the controller, and storing, in the first electronic key, an initial encryption key generation code unique to the first electronic key and an initial encryption key used to verify the first electronic key, and an initial registration step of storing the identification information stored in the controller in the first electronic key, obtaining the initial encryption key generation code from the first electronic key, generating the initial encryption key with an initial encryption key generation logic that uses the initial encryption key generation code, and storing the initial encryption key in the controller.

Regarding the second aspect, the electronic key corresponds only to the controller of the communication subject to which the identification information is registered. The electronic key does not correspond to another communication subject to which the identification information is not registered. This restricts registration of the initial registration electronic key to the controller of another communication subject.

In the third aspect, the electronic key registration method further includes a replacement controller production step of storing the identification information in a newly replaced controller, and a replacement controller registration step of obtaining the additional encryption key generation code from the second electronic key and generating the additional encryption key with the additional encryption key generation logic when the identification information is stored in the second electronic key, and storing the additional encryption key in the replaced controller when the second electronic key is verified with the additional encryption key.

In the fourth aspect, the electronic key registration method further includes a replacement controller production step of storing the identification information in a newly replaced controller, and a replacement controller registration step of obtaining the initial encryption key generation code from the first electronic key and generating the initial encryption key with the initial encryption key generation logic when the identification information is stored in the first electronic key, and storing the initial encryption key in the replaced controller when the first electronic key is verified with the initial encryption key.

Regarding the third and fourth aspects, in the replacement controller registration step, when the identification information unique to the communication subject is written to the electronic key, the electronic key is registerable to the controller. This restricts registration of the electronic key that does not store the identification information to the controller. Also, in the replacement controller registration step, the encryption key unique to the electronic key is generated with the encryption key generation logic, which uses the encryption key generation code stored in the electronic key, and the encryption key is stored in the controller when verification of the electronic key with the encryption key is accomplished. Therefore, the controller verifies only the authentic electronic key. This allows for registration of only the electronic key, which stores the identification information unique to the communication subject and the encryption key generated with the key generation logic unique to the electronic key, to the controller.

In the fifth aspect, in the electronic key registration method, the replacement controller registration step includes temporarily storing the initial encryption key generated with the initial encryption key generation logic in the replaced controller and storing the initial encryption key in the replaced controller when the first electronic key is verified with the initial encryption key.

Regarding the fifth aspect, the first electronic key, which stores the identification information unique to the communication subject and the initial encryption key generated with the initial encryption key generation logic, is registerable to the controller.

In the sixth aspect, in the electronic key registration method, the replacement controller registration step includes discarding the initial encryption key generated with the initial encryption key generation logic when the second electronic key is not verified with the initial encryption key, obtaining the additional encryption key generation code from the second electronic key and generating the additional encryption key with the additional encryption key generation logic when the identification information is stored in the second electronic key, temporarily storing the additional encryption key, which is generated with the additional encryption key generation logic, in the replaced controller, and storing the additional encryption key in the replaced controller when the second electronic key is verified with the additional encryption key.

Regarding the sixth aspect, in the replacement controller registration step, when verification of the electronic key with the first encryption key, which is generated with the first encryption key generation logic, is not accomplished, the electronic key may be the additional registration electronic key. In this case, the additional encryption key generation code is extracted from the electronic key, and the additional encryption key is generated with the additional encryption key generation logic. Then, when verification of the electronic key with the additional encryption key is accomplished, the additional encryption key is stored in the controller. Therefore, the controller verifies the additional registration electronic key. This additionally allows for registration of the electronic key, which stores the identification information unique to the communication subject and the additional encryption key generated with the additional encryption key generation logic, to the controller.

In the seventh aspect, in the electronic key registration method, the additional key production step includes adding a random number to the identification information and storing, in the second electronic key, the additional encryption key generated with the additional encryption key generation logic that uses the identification information, to which the random number is added, and the additional encryption key generation code, and the key additional registration step includes obtaining the additional encryption key generation code from the second electronic key when the identification information is stored in the second electronic key, generating the additional encryption key with the additional key generation logic that uses the identification information, to which the random number is added, and the additional encryption key generation code, and storing the additional encryption key in the controller.

Regarding the seventh aspect, the random number is needed in the key additional registration step. Thus, even when the identification information, the additional encryption key generation code, and the additional encryption key generation logic are obtained from the electronic key, the additional encryption key cannot be generated without the identification information to which the random number is added. This further improves security level.

In the eighth aspect, in the electronic key registration method, the additional key production step includes adding a random number to the identification information and storing, in the second electronic key, the additional encryption key generated with the additional encryption key generation logic that uses the identification information, to which the random number is added, and the additional encryption key generation code, the replacement controller production step includes storing the random number in the replaced controller, the replacement controller registration step includes discarding the initial encryption key generated with the initial encryption key generation logic when the second electronic key is not verified with the initial encryption key, obtaining the additional encryption key generation code from the second electronic key when the identification information is stored in the second electronic key, generating the additional encryption key with the additional encryption key generation logic that uses the identification information, to which the random number is added, and the additional encryption key generation code, temporarily storing the additional encryption key in the replaced controller, and storing the additional encryption key in the replaced controller when the second electronic key is verified with the additional encryption key.

Regarding the eighth aspect, the random number is needed in the key additional registration step. Thus, even when the identification information, the additional encryption key generation code, and the additional encryption key generation logic are obtained from the electronic key, the additional encryption key cannot be generated without the identification information to which the random number is added. This further improves security level.

In the ninth aspect, in the electronic key registration method, the controller inhibits the use of the random number that has been used to generate the additional encryption key.

Regarding the ninth aspect, the use of the used random number, which has been used to generate the additional encryption key, is inhibited after the second electronic key is additionally registered. This prevents additional registration of another electronic key to the controller unless a new random number is set. This further improves security.

In the tenth aspect, in the electronic key registration method, the controller inhibits the use of the initial encryption key generation logic that has been used to generate the initial encryption key.

Regarding the tenth aspect, the use of the initial encryption key generation logic is inhibited after the first electronic key is initially registered. This prevents another electronic key, which has obtained the initial encryption key in a wrongful manner, from being newly registered to the controller.

In the eleventh aspect, in the electronic key registration method, based on order information generated by checking the identification information that is set in advance for the communication subject, identification information that differs for each communication subject is stored in the replacement controller and the second electronic key prior to shipment.

Regarding the eleventh aspect, the identification information, which differs for each communication subject, is stored in the replacement controller and the second electronic key, which is additionally registered, when shipped out from the factory. This inhibits registration of the electronic key to the controller, which differs from the order, and registration of the electronic key, which differs from the order, to the controller after being circulated in the market.

The twelfth aspect is an electronic key registration system. The system includes a controller located in a communication subject and a first and second electronic keys capable of controlling the communication subject. The first electronic key stores identification information of the communication subject, a first encryption key generation code, and a first encryption key. The second electronic key stores the identification information, a second encryption key generation code, and a second encryption key. The controller obtains the first encryption key generation code from the first electronic key, generates the first encryption key with a first encryption key generation logic that uses the first encryption key generation code, verifies the first electronic key with the first encryption key, and registers the first encryption key. The controller also obtains the identification information and the second encryption key generation code from the second electronic key, generates the second encryption key with a second encryption key generation logic that uses the identification information and the second encryption key generation code, verifies the second electronic key with the second encryption key, and registers the second electronic key.

The present invention allows for easy registration of the electronic key while ensuring security.

BRIEF DESCRIPTION OF THE DRAWINGS

FIG. 9 is a sequence chart showing the additional registration operation of the electronic key to the replacement immobilizer ECU of the electronic key registration system.

DESCRIPTION OF THE EMBODIMENTS

First Embodiment

An electronic key registration system applied to a vehicle according to the first embodiment of the present invention will now be described with reference to FIGS. 1 to 5.

Figure 1:
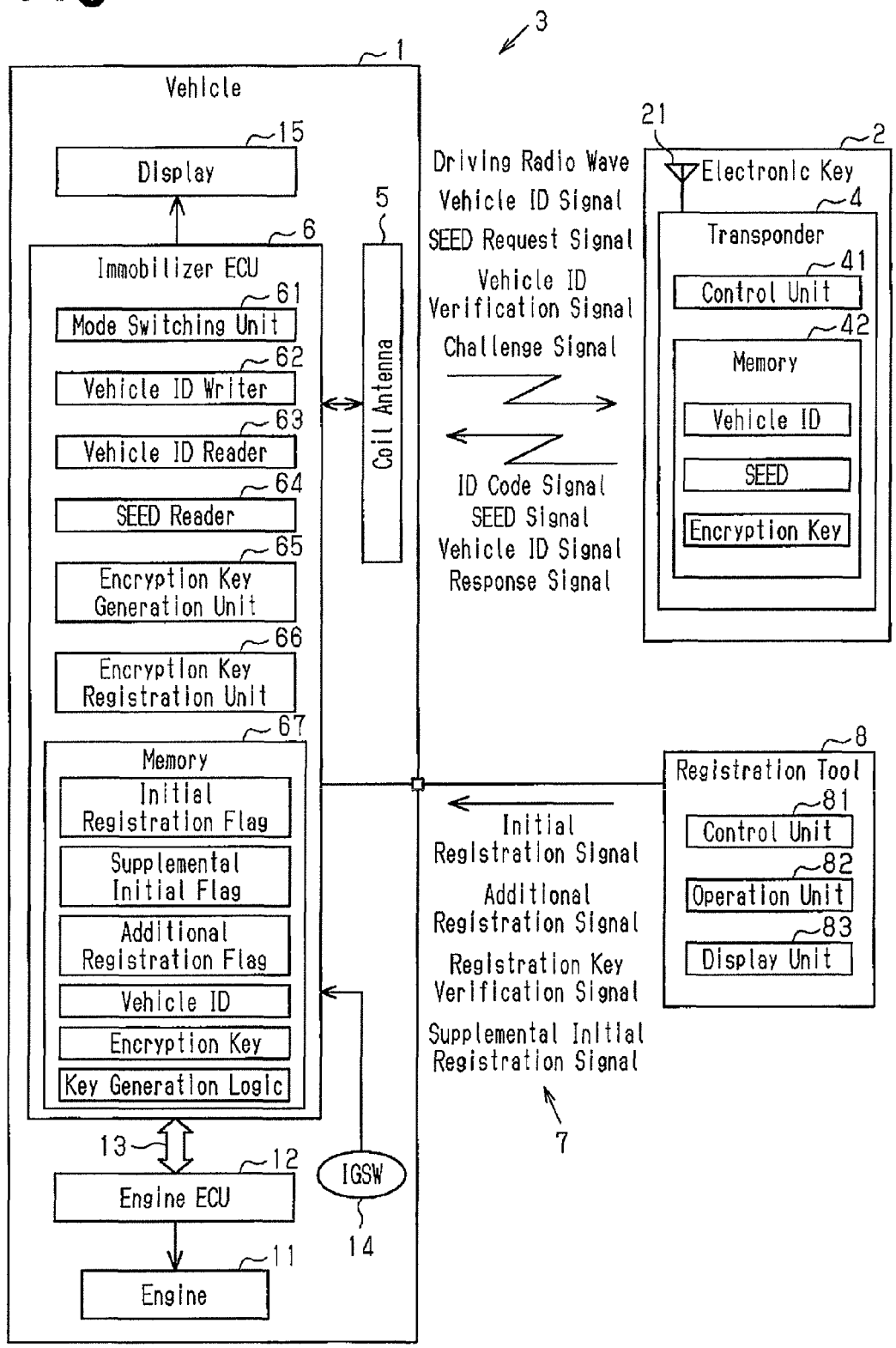
FIG. 1 is a schematic block diagram showing the configuration of an electronic key registration system.

As shown in FIG. 1, a vehicle 1 includes an immobilizer system 3 that performs ID verification with an electronic key 2 through, for example, near field communication (radio communication in which the communication distance is approximately a few centimeters). The electronic key 2 includes an ID tag, which is a so-called transponder 4. In the immobilizer system 3, the transponder 4 is activated with a driving radio wave, which is transmitted from a coil antenna 5 of the vehicle 1. Then, ID verification is performed based on an ID code signal, which is transmitted from the transponder 4. The vehicle 1 is one example of a communication subject. The immobilizer system 3 is one example of an electronic key system.

The vehicle 1 includes an immobilizer ECU 6, which controls the immobilizer system 3. The immobilizer ECU 6 is connected, through an in-vehicle LAN 13, to an engine ECU 12, which controls operations of an engine 11. The immobilizer ECU 6 includes a memory 67, which stores an ID code of the electronic key 2 corresponding to the vehicle 1. In addition, the immobilizer ECU 6 is connected to the coil antenna 5, which receives and transmits radio waves, for example, in the low frequency (LF) bandwidth and radio waves in the high frequency (HF) bandwidth. The coil antenna 5, which is arranged in a key cylinder, is a magnetic field antenna that transmits radio waves with a magnetic-field component. The immobilizer ECU 6 is one example of a controller.

The transponder 4 includes a control unit 41, which controls communication operations of the transponder 4, and a memory 42, which stores an ID code (transponder code) unique to the electronic key 2. The transponder 4 is connected to a receiving-transmitting antenna 21, which receives and transmits radio waves in the LF bandwidth and in the HF bandwidth in the same manner as the coil antenna 5.

In the vehicle 1 of the present embodiment, when starting the engine 11, a user, who enters the vehicle 1, inserts and turns the electronic key 2 in the key cylinder. When detecting the insertion of the electronic key 2 in the key cylinder, the immobilizer ECU 6 intermittently transmits the driving radio wave from the coil antenna 5. Then, the transponder 4 receives, with the receiving-transmitting antenna 21, the driving radio wave, which is transmitted from the coil antenna 5. This activates the transponder 4 using the driving radio wave.

When switched to the activation condition, the transponder 4 transmits, from the receiving-transmitting antenna 21, an ID code signal, which includes the ID code stored in the memory 42. The immobilizer ECU 6 receives, with the coil antenna 5, the ID code signal, which is transmitted from the transponder 4, and performs ID verification (immobilizer verification) with the ID code, which is included in the ID code signal. When ID verification is accomplished, the immobilizer ECU 6 holds a flag indicating accomplishment of ID verification in the memory 67.

The key cylinder includes an ignition switch (IGSW) 14, which detects the rotation position of the electronic key 2. For example, when the ignition switch 14 is operated to the engine-starting position, the engine ECU 12 determines whether or not the immobilizer ECU 6 is holding the flag that indicates accomplishment of ID verification. When determining that ID verification has been accomplished, the engine ECU 12 initiates ignition control and fuel injection control and starts the engine 11.

In the immobilizer verification, the challenge response verification is performed in addition to the code verification, which verifies the ID code of the electronic key 2. In the challenge response verification, the vehicle 1 generates a challenge code, for example, a random number code, and transmits the challenge code to the electronic key 2. The electronic key 2 calculates a response code based on the challenge code and sends the response code back to the vehicle 1. The vehicle 1 also calculates a response code based on the challenge code. Then, the vehicle 1 determines whether or not the response code calculated by the vehicle 1 is the same as the response code received from the electronic key 2. The common key cryptosystem, which uses a common encryption key, is employed for verification between the immobilizer ECU 6 (vehicle 1) and the transponder 4 (electronic key 2). The transponder 4 and the immobilizer ECU 6 each calculate the response code from the challenge code using the common encryption key.

The memory 42 of the transponder 4 stores a vehicle ID (VID) that is identification information unique to the vehicle 1, an encryption key K that is used to verify the electronic key 2, and a SEED code (SC) that is an encryption key generation code unique to the electronic key 2 and used to generate an encryption key K.

The memory 67 of the immobilizer ECU 6 holds an initial registration flag, a supplemental initial flag, and an additional registration flag. The initial registration flag indicates whether or not initial registration of the electronic key 2 to the immobilizer ECU 6 is permitted. The supplemental initial flag indicates whether or not the electronic key 2 is permitted to be initially registered to an immobilizer ECU 6 that has been supplied as a replacement. The additional registration flag indicates whether or not the electronic key 2 is permitted to be additionally registered to the immobilizer ECU 6 (or the replacement immobilizer ECU 6). The memory 67 of the immobilizer ECU 6 stores a vehicle ID (VID) that is identification information unique to the vehicle 1, an encryption key K that is used to verify the electronic key 2, and an encryption key generation logic that is used to generate the encryption key K.

The immobilizer system 3 includes an electronic key registration system 7, which registers the electronic key 2 to the immobilizer ECU 6. The electronic key registration system 7 initially registers the electronic key 2 to the immobilizer ECU 6, additionally registers the electronic key 2 to the immobilizer ECU 6, and registers the electronic key 2 to the replacement immobilizer ECU 6.

In the electronic key registration system 7, the encryption key K, which is used to verify the electronic key 2, is stored in the immobilizer ECU 6 to register the electronic key 2 to the immobilizer ECU 6. In this case, the immobilizer ECU 6 does not directly obtain the encryption key K from the electronic key 2. The immobilizer ECU 6 obtains the SEED code from the electronic key 2 to generate the encryption key K. When storing the encryption key K, the immobilizer ECU 6 also stores the ID code, which is unique to the electronic key 2 and obtained from the electronic key 2.

The electronic key registration system 7 includes a registration tool 8, which is connectable to the vehicle 1. When registering the electronic key 2 to the immobilizer ECU 6, the registration tool 8, which is connected to the vehicle 1, switches operation modes of the immobilizer ECU 6 to a registration mode. The registration tool 8 includes a control unit 81 that controls the registration tool 8, an operation unit 82 that detects a registration operation performed by a user, and a display unit 83 that displays a registration operation. When an initial registration mode is set to register a new electronic key 2, the registration tool 8 transmits, to the vehicle 1, an initial registration signal to change the operation mode of the immobilizer ECU 6 to the initial registration mode. When an additional registration mode is set to additionally register the electronic key 2, the registration tool 8 transmits, to the vehicle 1, an additional registration signal to change the operation mode of the immobilizer ECU 6 to the additional registration mode and a registration key verification signal to check if the electronic key 2 has been registered. When a supplemental initial registration mode is set to initially register the electronic key 2 to the replacement immobilizer ECU 6, the registration tool 8 transmits, to the vehicle 1, a supplemental initial registration signal to change the operation mode of the immobilizer ECU 6 to the supplemental initial registration mode.

The immobilizer ECU 6 includes a mode switching unit 61, which switches operation modes. When receiving the initial registration signal from the registration tool 8, the mode switching unit 61 switches the operation mode to the initial registration mode. When receiving the additional registration signal from the registration tool 8, the mode switching unit 61 switches the operation mode to the additional registration mode. When receiving the supplemental initial registration signal from the registration tool 8, the mode switching unit 61 switches the operation mode to the supplemental initial registration mode.

The immobilizer ECU 6 includes a vehicle ID writer 62, which writes a vehicle ID to the electronic key 2 that is initially registered. When the operation mode is switched to the initial registration mode, the vehicle ID writer 62 transmits a vehicle ID signal, which includes the vehicle ID stored in the memory 67, from the coil antenna 5 to the electronic key 2.

The immobilizer ECU 6 includes a vehicle ID checker 63, which checks whether or not the vehicle ID stored in the electronic key 2 is correct. When the operation mode is switched to the additional registration mode or the supplemental initial mode, the vehicle ID checker 63 transmits a vehicle ID verification signal from the coil antenna 5 to the electronic key 2. Then, the vehicle ID checker 63 checks whether or not the vehicle ID, which is included in the vehicle ID signal transmitted from the electronic key 2, is the same as the vehicle ID stored in the memory 67.

The immobilizer ECU 6 includes a SEED reader 64, which reads a SEED from the electronic key 2, to generate the encryption key K, which is stored in the electronic key 2. When the operation mode is switched to the initial registration mode, the additional registration mode, or the supplemental initial registration mode, the SEED reader 64 transmits a SEED request signal from the coil antenna 5 to request for the SEED code and extracts the SEED code from a SEED signal, which is transmitted from the electronic key 2.

The immobilizer ECU 6 includes an encryption key generation unit 65, which generates the encryption key K. In the initial registration mode, the encryption key generation unit 65 generates the encryption key K with a first key generation logic f, which uses the SEED code obtained by the SEED reader 64. In the additional registration mode, the encryption key generation unit 65 generates the encryption key K with a second key generation logic g, which uses the SEED code obtained by the SEED reader 64 and the vehicle ID stored in the memory 67. The first key generation logic f is one example of an initial encryption key generation logic. The second key generation logic g is one example of an additional encryption key generation logic.

The immobilizer ECU 6 includes an encryption key registration unit 66, which registers the encryption key K and changes flags. In the initial registration mode and the additional registration mode, the encryption key registration unit 66 stores, in the memory 67, the encryption key K, which is generated with the encryption key generation unit 65. This completes registration of the encryption key K to the immobilizer ECU 6. In contrast, in the supplemental initial registration mode, the encryption key registration unit 66 performs the challenge response verification after temporarily storing, in the memory 67, the encryption key K, which is generated with the encryption key generation unit 65. The encryption key registration unit 66 transmits a challenge signal, which includes the challenge code, from the coil antenna 5 and receives a response signal, which includes the response code, from the electronic key 2. The encryption key registration unit 66 calculates a response code using the challenge code and the encryption key K. Then, the encryption key registration unit 66 determines whether or not the response code, which is obtained from calculation, is the same as the response code transmitted from the electronic key 2 (response verification). When the response verification is accomplished, the encryption key registration unit 66 stores the encryption key in the memory 67. This completes registration of the encryption key K to the immobilizer ECU 6. After the encryption key K is stored in the initial registration mode, when detecting an initial registration denial operation, the encryption key registration unit 66 inhibits the use of the first key generation logic f and rejects subsequent initial registration. The initial registration denial operation is, for example, an operation in which the ignition switch 14 is repeatedly switched on and off twenty times. In the same manner, after the encryption key K is stored in the supplemental registration mode, the encryption key registration unit 66 inhibits the use of the first key generation logic f and rejects subsequent supplemental initial registration.

The electronic key 2 obtains the vehicle ID of the vehicle 1 from the vehicle 1 in advance. For example, when a specific operation that requests for the vehicle ID from the vehicle 1 is performed, the vehicle ID is shown on the display 15. When additionally registering the additional electronic key 2, the vehicle ID may be shown on the display 15 when the existing electronic key 2 is inserted in the key cylinder and the immobilizer verification is accomplished.

A registration operation of the electronic key 2 to the immobilizer ECU 6 performed by the electronic key registration system 7 will now be described with reference to FIGS. 2 to 5.

In the initial producing step, the memory 67 of the immobilizer ECU 6 stores the vehicle ID (VID-A) of the vehicle 1, the first key generation logic f, and the second key generation logic g. In the memory 67, the initial registration flag and the additional registration flag are set to an acceptance state, which permits registration of the electronic key 2, and the supplemental initial flag is set to a denial state, which rejects registration of the electronic key 2. In the initial production step, the memory 42 of the initial registration electronic key 2 stores the SEED code (SC-1) and the encryption key (K-1) generated with the first key generation logic f, which uses the SEED code (SC-1). A registration device performs registration of the SEED code and the encryption key to the electronic key 2. Any computer may be employed as the registration device. Alternatively, the registration tool 8 may be employed as the registration device. The SEED code (SC-1) is one example of an initial encryption key generation code. The encryption key (K-1) is one example of an initial encryption key.

Next, the registration of the electronic key 2 in the factory will be described. When the electronic key 2 is initially registered to the immobilizer ECU 6, the registration tool 8 is connected to the vehicle 1 in an initial registration step.

Figure 2:
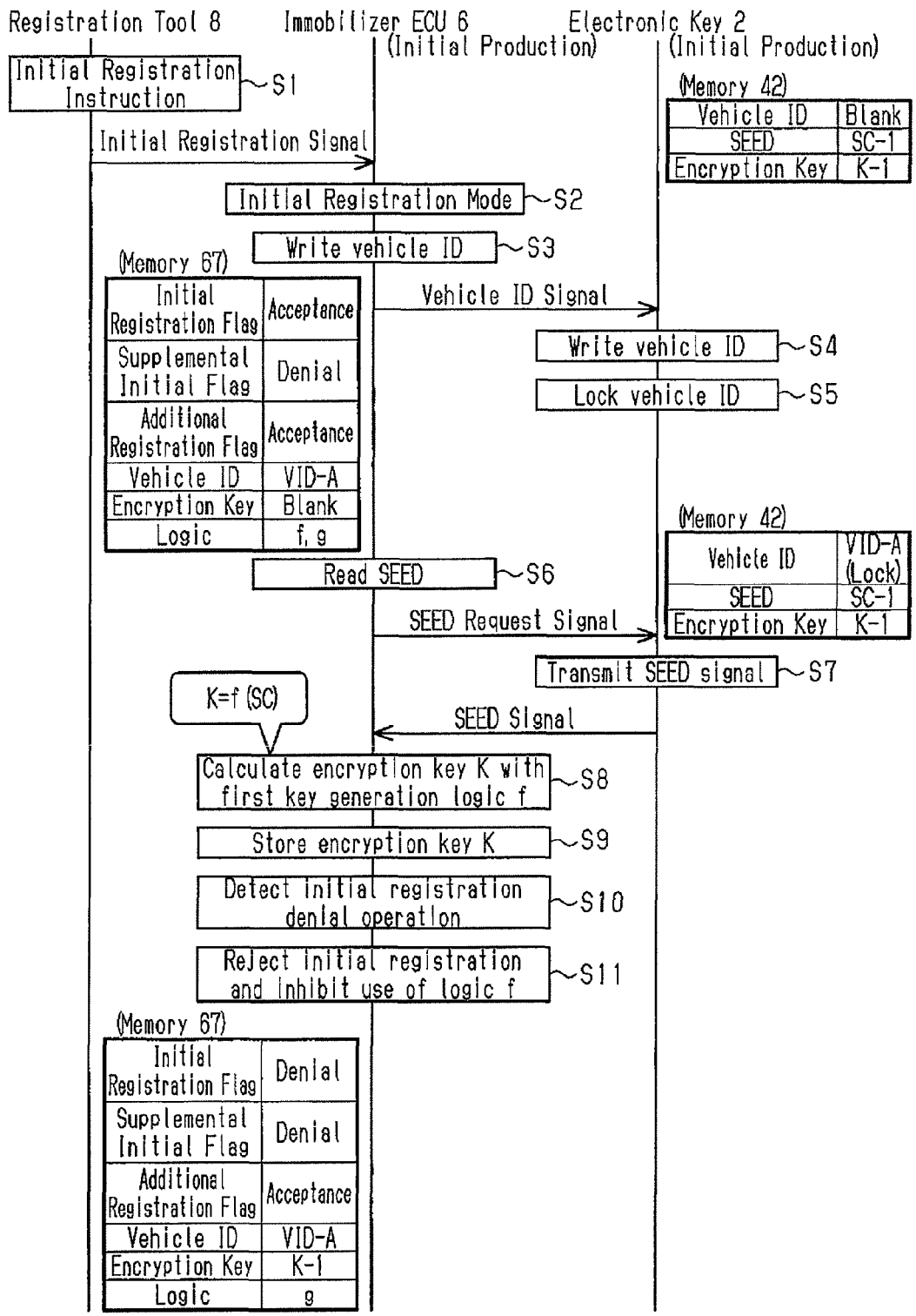
FIG. 2 is a sequence chart showing the registration operation in a factory of the electronic key registration system.

As shown in FIG. 2, when a user operates the operation unit 82 to select the initial registration mode, the control unit 81 of the registration tool 8 transmits, to the immobilizer ECU 6, an initial registration signal, which serves as an initial registration instruction (step S1). In response to the initial registration signal, the immobilizer ECU 6 switches the operation mode to the initial registration mode (step S2).

In the initial registration mode, the immobilizer ECU 6 writes the vehicle ID from the memory 67 to the electronic key 2 (step S3). In the present embodiment, the vehicle ID writer 62 transmits the vehicle ID signal, which includes the vehicle ID (VID-A) stored in the memory 67, from the coil antenna 5 to the electronic key 2.

When receiving the vehicle ID signal, the electronic key 2 writes the vehicle ID to the memory 42 (step S4). In the present embodiment, the transponder 4 stores the vehicle ID (VID-A) in the memory 42. Subsequently, the electronic key 2 locks the vehicle ID (step S5). That is, the transponder 4 inhibits overwriting of the vehicle ID of the memory 42.

Following the writing of the vehicle ID, the immobilizer ECU 6 reads the SEED code from the electronic key 2 (step S6). In the present embodiment, the SEED reader 64 transmits the SEED request signal from the coil antenna 5 to request for the SEED code.

When receiving the SEED request signal, the electronic key 2 transmits the SEED signal (step S7). In the present embodiment, the transponder 4 transmits the SEED signal, which includes the SEED code (SC-1) stored in the memory 42.

The immobilizer ECU 6 calculates the encryption key (K-1) with the first key generation logic f (step S8). In the present embodiment, the SEED reader 64 obtains the SEED code (SC-1) from the SEED signal. Then, the encryption key generation unit 65 generates the encryption key (K-1) with the first key generation logic f, which uses the SEED code (SC-1). Thus, the immobilizer ECU 6 does not directly obtain the encryption key (K-1) from the electronic key 2. The immobilizer ECU 6 obtains the SEED code (SC-1) to generate the encryption key (K-1).

The immobilizer ECU 6 stores the encryption key (K-1) in the memory 67 (step S9). In the present embodiment, the encryption key registration unit 66 stores, in the memory 67, the encryption key (K-1), which is generated with the encryption key generation unit 65. This completes registration of the encryption key (K-1) to the immobilizer ECU 6. The immobilizer ECU 6 performs immobilizer verification on the electronic key 2 using the registered encryption key (K-1).

Then, when detecting the initial registration denial operation (step S10), the immobilizer ECU 6 inhibits the use of the first key generation logic f and rejects subsequent initial registration (step S11). In the present embodiment, when the ignition switch is repeatedly switched on and off twenty times, the encryption key registration unit 66 determines that the initial registration denial operation has been performed. This inhibits the initial registration of the electronic key 2 to the immobilizer ECU 6.

Additional registration of the electronic key 2 will now be described with reference to FIG. 3. In the additional key production step, the memory 67 of the immobilizer ECU 6 stores the vehicle ID (VID-A) of the vehicle 1, the encryption key (K-1), and the second key generation logic g. In the memory 67, the initial registration flag and the supplemental initial flag are set to the denial state, and the supplemental initial registration flag is set to the acceptance state. Additionally, in the additional key production step, the memory 42 of the additional registration electronic key 2 stores the vehicle ID (VID-A) of the vehicle 1, the SEED code (SC-9), and the encryption key (K-9) in accordance with an order sheet (order information). The encryption key (K-9) is generated with the second key generation logic g, which uses the vehicle ID (VID-A) and the SEED code (SC-9). The SEED code (SC-9) is one example of an additional encryption key generation code. The encryption key (K-9) is one example of an additional encryption key. A registration device performs registration of the vehicle ID, the SEED code, and the encryption key to the electronic key 2. Any computer may be employed as the registration device. Alternatively, the registration tool 8 may be employed as the registration device. Then, the registration tool 8 is connected to the vehicle 1 to perform a registration operation.

Figure 3:
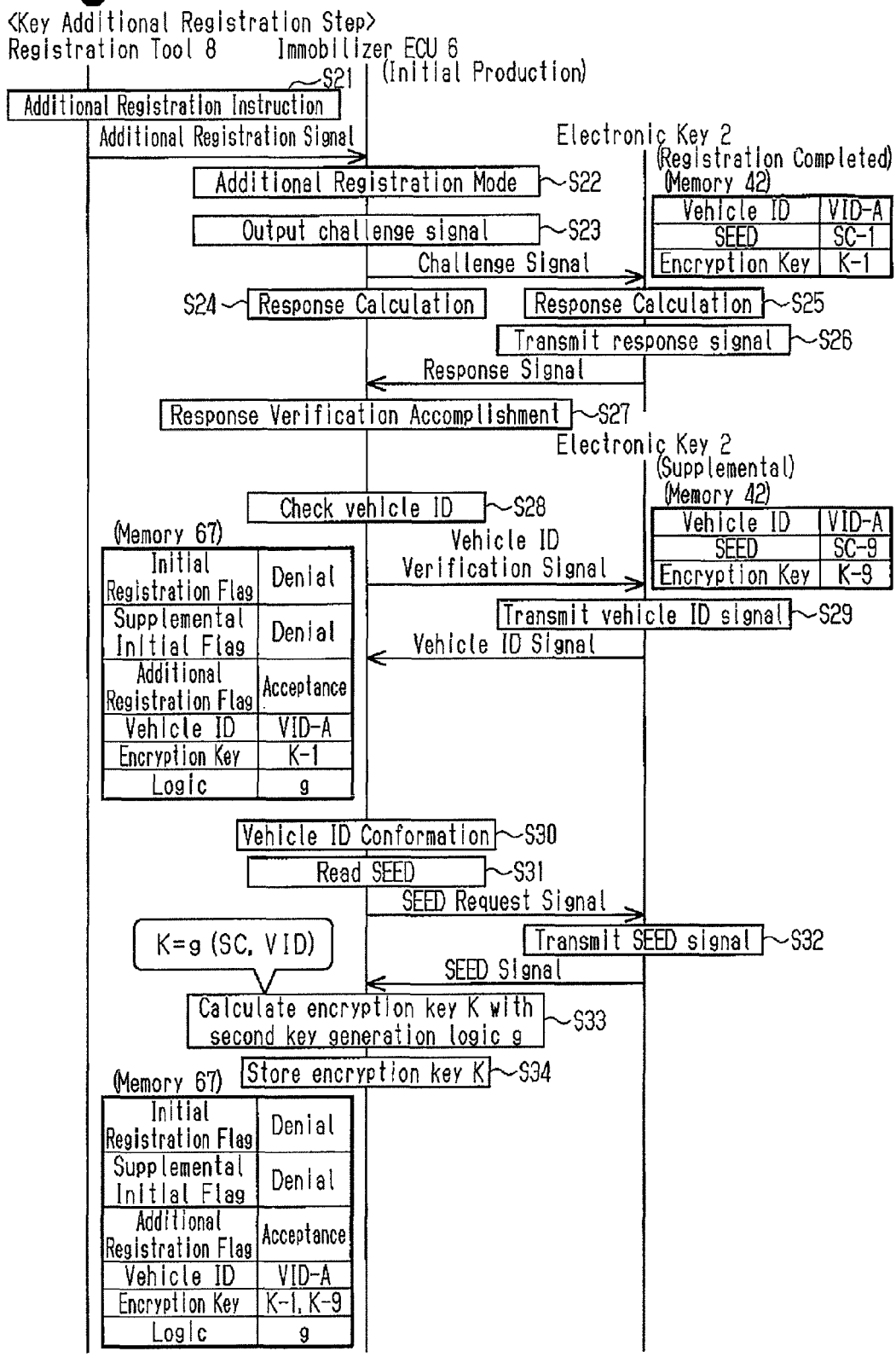
FIG. 3 is a sequence chart showing the registration operation when additionally registering an electronic key of the electronic key registration system.

As shown in FIG. 3, in a key additional registration step, when a user operates the operation unit 82 to select the additional registration mode, the control unit 82 of the registration tool 8 transmits, to the immobilizer ECU 6, an additional registration signal, which serves as an additional registration instruction (step S21). When receiving the additional registration signal, the immobilizer ECU 6 switches the operation mode to the additional registration mode (step S22). In the present embodiment, the mode switching unit 61 sets the additional registration mode in response to the additional registration signal.

When the additional registration mode is set, the immobilizer ECU 6 performs the challenge response verification to check whether or not the encryption key (K-1) of the electronic key 2, which has been registered to the vehicle 1, is correct. Namely, the immobilizer ECU 6 transmits a challenge signal (step S23). In the present embodiment, the encryption key registration unit 66 transmits a challenge signal, which includes the challenge code, from the coil antenna 5. The encryption key registration unit 66 also calculates a response code using the challenge code and the encryption key (K-1) (step S24). In the same manner, the electronic key 2, which has been registered to the vehicle 1, calculates a response code using the challenge code and the encryption key (K-1) (step S25). The electronic key 2 transmits a response signal, which includes the response code obtained from the response calculation (step S26).

When receiving the response signal, the immobilizer ECU 6 (encryption key registration unit 66) performs the response verification and determines whether or not the two response codes are the same. Accomplishment of the response verification (step S27) enables a new electronic key 2 to be registered to the immobilizer ECU 6. In this manner, the encryption key registration unit 66 checks the encryption key (K-1) of the electronic key 2, which has been registered to the vehicle 1, based on accomplishment of the response verification.

Then, the immobilizer ECU 6 checks the vehicle ID, which is stored in the electronic key 2 (step S28). In the present embodiment, the vehicle ID checker 63 transmits a vehicle ID verification signal from the coil antenna 5 to the electronic key 2 to check whether or not the vehicle ID stored in the memory 67 conforms to the vehicle ID stored in the electronic key 2.

When receiving the vehicle ID verification signal, the electronic key 2 transmits a vehicle ID signal (step S29). In the present embodiment, the transponder 4 transmits the vehicle ID signal, which includes the vehicle ID (VID-A) stored in the memory 42.

The immobilizer ECU 6 (vehicle ID checker 63) checks whether or not the vehicle ID, which is received from the electronic key 2, conforms to the vehicle ID, which is stored in the memory 67. When the two vehicle IDs are the same (step S30), the immobilizer ECU 6 reads the SEED code from the electronic key 2 (step S31). In the present embodiment, the SEED reader 64 transmits a SEED request signal from coil antenna 5 to request for the SEED code.

When receiving the SEED request signal, the electronic key 2 transmits a SEED signal (step S32). In the present embodiment, the transponder 4 transmits the SEED signal, which includes the SEED code (SC-9) stored in the memory 42.

The immobilizer ECU 6 calculates the encryption key (K-9) with the second key generation logic g (step S33). In the present embodiment, the SEED reader 64 first obtains the SEED code (SC-9) from the SEED signal. Then, the encryption key generation unit 65 generates the encryption key (K-9) with the second key generation logic g, which uses the SEED code (SC-9) obtained by the SEED reader 64 and the vehicle ID stored in the memory 67. Thus, the immobilizer ECU 6 does not directly obtain the encryption key (K-9) from the electronic key 2. The immobilizer ECU 6 obtains the SEED code (SC-9) to generate the encryption key (K-9).

The immobilizer ECU 6 stores the encryption key (K-9) in the memory 67 (step S34). In the present embodiment, the encryption key registration unit 66 stores, in the memory 67, the encryption key (K-9), which is generated with the encryption key generation unit 65. This completes registration of the encryption key (K-9) to the immobilizer ECU 6. The immobilizer ECU 6 performs immobilizer verification on the electronic key 2 using the registered encryption key (K-9).

Registration of the electronic key 2 when the immobilizer ECU 6 is replaced will now be described with reference to FIG. 4. In a replacement controller production step (replacement ECU production step), the immobilizer ECU 6 that is supplied as a replacement is produced. The memory 67 of the replacement immobilizer ECU 6 stores the vehicle ID (VID-A) of the vehicle 1, the first key generation logic f, and the second key generation logic g in accordance with an order sheet. In the memory 67, the initial registration flag is set to a denial state, and the additional registration flag and the supplemental initial flag are set to an acceptance state. The memory 42 of the initial production electronic key 2, which has been registered to the vehicle 1, stores the vehicle ID (VID-A) of the vehicle 1, the SEED code (SC-1), and the encryption key (K-1). The encryption key (K-1) is generated with the first key generation logic f, which uses the SEED code (SC-1). Then, the registration tool 8 is connected to the vehicle 1 to perform a registration operation of the electronic key 2.

Figure 4:
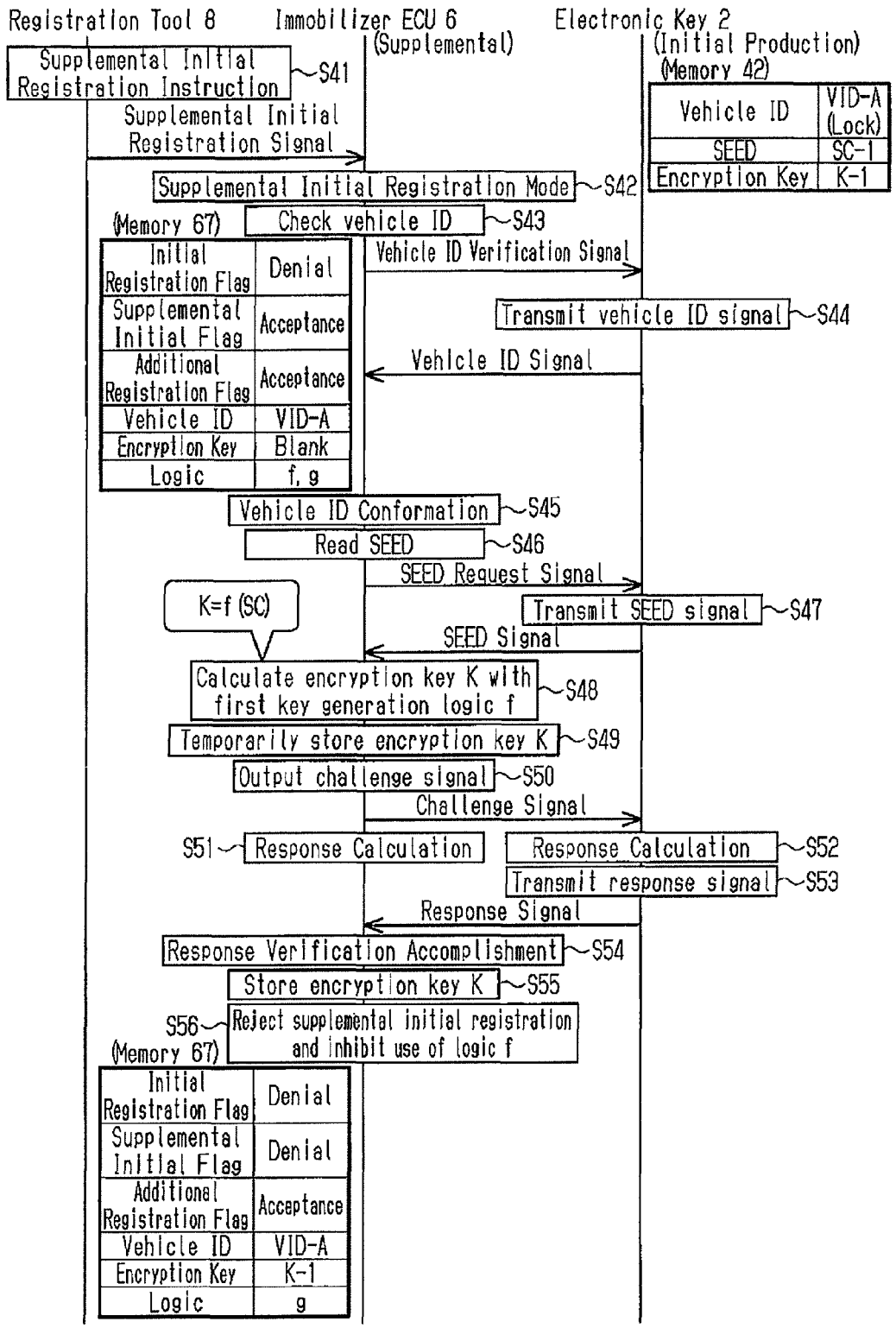
FIG. 4 is a sequence chart showing the registration operation when registering the electronic key to a replacement immobilizer ECU of the electronic key registration system.

As shown in FIG. 4, in a replacement controller registration step (replacement ECU registration step), the replacement immobilizer ECU 6 is registered. When a user operates the operation unit 82 to select the supplemental initial registration mode, the control unit 82 of the registration tool 8 transmits, to the immobilizer ECU 6, a supplemental initial registration signal, which serves as a supplemental initial registration instruction (step S41). When receiving the supplemental initial registration signal, the immobilizer ECU 6 switches the operation mode to the supplemental initial registration mode (step S42). In the present embodiment, the mode switching unit 61 sets the supplemental initial registration mode in response to the supplemental initial registration signal.

The immobilizer ECU 6 checks the vehicle ID, which is stored in the electronic key 2 (step S43). In the present embodiment, the vehicle ID checker 63 transmits a vehicle ID verification signal from the coil antenna 5 to the electronic key 2 to check whether or not the vehicle ID stored in the memory 67 conforms to the vehicle ID stored in the electronic key 2.

When receiving the vehicle ID verification signal, the electronic key 2 transmits a vehicle ID signal (step S44). In the present embodiment, the transponder 4 transmits the vehicle ID signal, which includes the vehicle ID (VID-A) stored in the memory 42.

The immobilizer ECU 6 (vehicle ID checker 63) checks whether or not the vehicle ID, which is received from the electronic key 2, conforms to the vehicle ID, which is stored in the memory 67. When the two vehicle IDs are the same (step S45), the immobilizer ECU 6 reads the SEED code from the electronic key 2 (step S46). In the present embodiment, the SEED reader 64 transmits a SEED request signal from the coil antenna 5 to request for the SEED code.

When receiving the SEED request signal, the electronic key 2 transmits a SEED signal (step S47). In the present embodiment, the transponder 4 transmits the SEED signal, which includes the SEED code (SC-1) stored in the memory 42.

The immobilizer ECU 6 calculates the encryption key (K-1) with the first key generation logic f (step S48). In the present embodiment, the SEED reader 64 first obtains the SEED code (SC-1) from the SEED signal. Then, the encryption key generation unit 65 generates the encryption key (K-1) with the first key generation logic f, which uses the SEED code (SC-1) obtained by the SEED reader 64. Thus, the immobilizer ECU 6 does not directly obtain the encryption key (K-1) from the electronic key 2. The immobilizer ECU 6 obtains the SEED code (SC-1) to generate the encryption key (K-1).

The immobilizer ECU 6 temporarily stores the encryption key (K-1) in the memory 67 (step S49). In the present embodiment, the encryption key registration unit 66 temporarily stores, in the memory 67, the encryption key (K-1), which is generated with the encryption key generation unit 65.

Then, the immobilizer ECU 6 performs the challenge response verification to check whether or not the encryption key (K-1), which is temporarily stored, is correct. Namely, the immobilizer ECU 6 transmits a challenge signal (step S50). In the present embodiment, the encryption key registration unit 66 transmits a challenge signal, which includes the challenge code, from the coil antenna 5. The encryption key registration unit 66 also calculates a response code using the challenge code and the encryption key (K-1) (step S51). In the same manner, the electronic key 2 calculates a response code using the challenge code and the encryption key (K-1) (step S52). The electronic key 2 transmits a response signal, which includes the response code obtained from the response calculation (step S53).

When receiving the response signal, the immobilizer ECU 6 performs the response verification and determines whether or not the two response codes are the same. When the response verification is accomplished (step S54), the immobilizer ECU 6 (encryption key registration unit 66) stores the encryption key (K-1) (step S55). In this manner, the encryption key registration unit 66 stores the encryption key (K-1) in the memory 67 when the response verification is accomplished. This completes registration of the electronic key 2 to the immobilizer ECU 6.

The immobilizer ECU 6 inhibits the use of the first key generation logic f and rejects subsequent supplemental initial registration (step S56). In the present embodiment, the encryption key registration unit 66 inhibits the use of the first key generation logic f. This inhibits the supplemental initial registration of the electronic key 2 to the immobilizer ECU 6.

The electronic key 2 that has been registered to the replaced immobilizer ECU 6 may be the electronic key 2 that has been additionally registered to the replacement immobilizer ECU 6. In this case, the response verification, which uses the encryption key K generated with the first key generation logic f, fails. This is because the memory 42 of the electronic key 2 stores the vehicle ID (VID-A) of the vehicle 1, the SEED code (SC-9), the encryption key (K-9) generated with the second key generation logic g, which uses the vehicle ID (VID-A) and the SEED code (SC-9), while the memory 67 of the immobilizer ECU 6 stores the encryption key K that differs from the encryption key (K-9).

Figure 5:
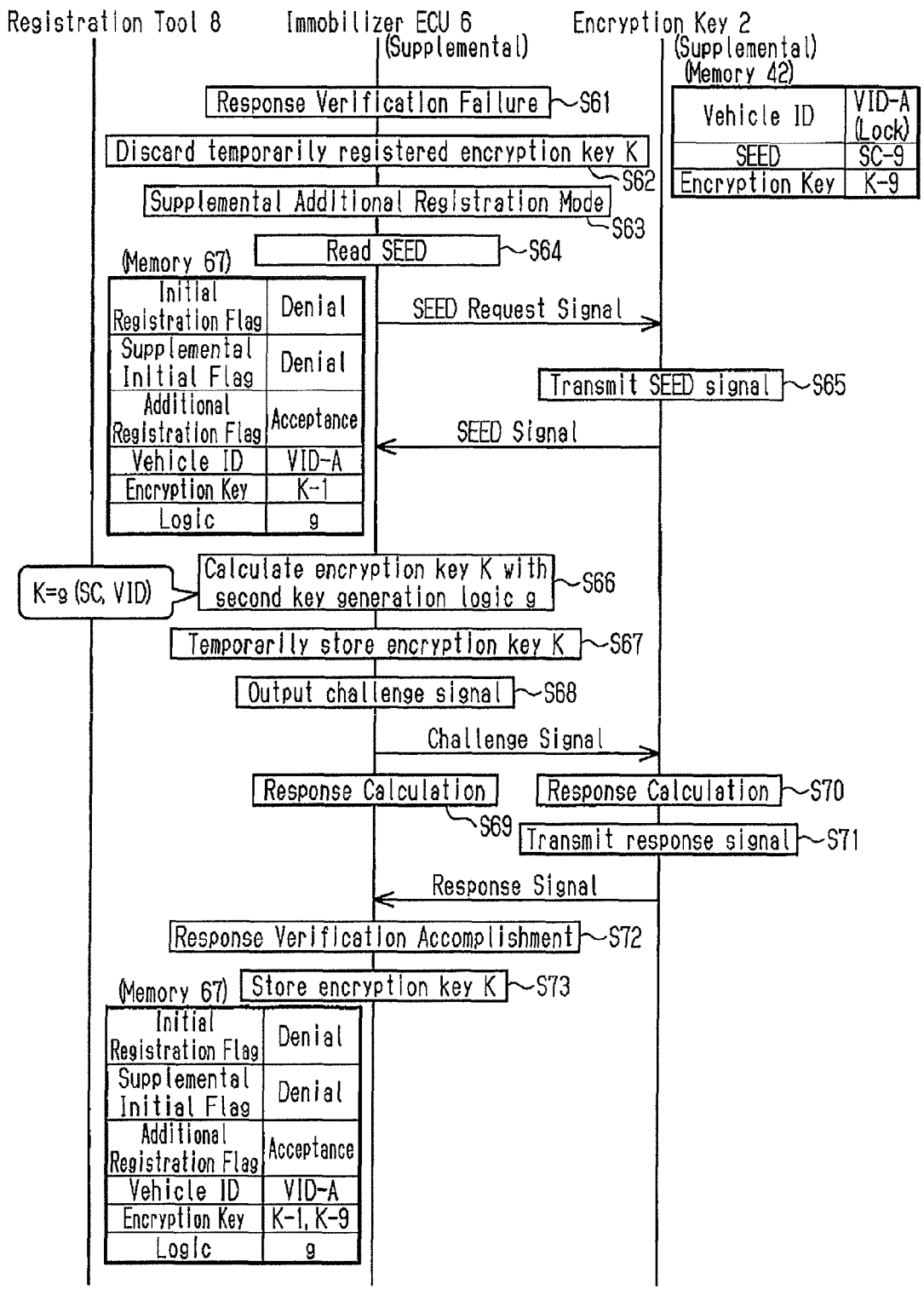
FIG. 5 is a sequence chart showing the registration operation when registering the electronic key to a replacement immobilizer ECU of the electronic key registration system.

As a result, as shown in FIG. 5, the response verification, which is performed using the response code transmitted from the electronic key 2, fails (step S61). Under this situation, the immobilizer ECU 6 discards the temporarily stored encryption key K (step S62). In the present embodiment, when the response verification fails, the encryption key registration unit 66 deletes the invalid encryption key K, which is temporarily stored, from the memory 67.

After discarding the invalid encryption key K, the immobilizer ECU 6 switches the operation mode to a supplemental additional registration mode (step S63). In the present embodiment, the mode switching unit 61 sets to the supplemental additional registration mode to additionally register the electronic key 2 to the replacement immobilizer ECU 6.

In the supplemental additional registration mode, the immobilizer ECU 6 reads the SEED code from the electronic key 2 (step S64). In the present embodiment, the SEED reader 64 transmits a SEED request signal from the coil antenna 5 to request for the SEED code.

When receiving the SEED request signal, the electronic key 2 transmits a SEED signal (step S65). In the present embodiment, the transponder 4 transmits the SEED signal, which includes the SEED code (SC-9) stored in the memory 42.

The immobilizer ECU 6 calculates the encryption key (K-9) with the second key generation logic g (step S66). In the present embodiment, the SEED reader 64 first obtains the SEED code (SC-9) from the SEED signal. Then, the encryption key generation unit 65 generates the encryption key (K-9) with the second key generation logic g, which uses the SEED code (SC-9) obtained by the SEED reader 64 and the vehicle ID (VID-A). Thus, the immobilizer ECU 6 does not directly obtain the encryption key (K-9) from the electronic key 2 The immobilizer ECU 6 obtains the SEED code (SC-9) and generates the encryption key (K-9).

The immobilizer ECU 6 temporarily stores the encryption key (K-1) in the memory 67 (step S67). In the present embodiment, the encryption key registration unit 66 temporarily stores, in the memory 67, the encryption key (K-9), which is generated with the encryption key generation unit 65.

Then, the immobilizer ECU 6 performs the challenge response verification to check whether or not the encryption key (K-9), which is temporarily stored, is correct. In detail, the immobilizer ECU 6 transmits a challenge signal (step S68). In the present embodiment, the encryption key registration unit 66 transmits a challenge signal, which includes the challenge code, from the coil antenna 5. The encryption key registration unit 66 also calculates a response code using the challenge code and the encryption key (K-9) (step S69). In the same manner, the electronic key 2 calculates a response code using the challenge code and the encryption key (K-9) (step S70). The electronic key 2 transmits a response signal, which includes the response code obtained from the response calculation (step S71).

When receiving the response signal, the immobilizer ECU 6 performs the response verification and determines whether or not or not the two response codes are the same. When the response verification is accomplished (step S72), the immobilizer ECU 6 (encryption key registration unit 66) stores the encryption key (K-9) (step S73). In this manner, the encryption key registration unit 66 stores the encryption key (K-9) in the memory 67 based on accomplishment of the response verification. This completes registration of the electronic key 2 to the immobilizer ECU 6. Thus, immobilizer verification may be performed between the immobilizer ECU 6 and the electronic key 2 regardless of whether the encryption key (K-1) or (K-9) is stored in the electronic key 2.

As described above, in the electronic key registration system 7, the immobilizer ECU 6 checks whether or not the electronic key 2 is associated with the immobilizer ECU 6 based on the vehicle ID, which is stored in the electronic key 2 in advance. Additionally, the immobilizer ECU 6 obtains the SEED code from the electronic key 2 to generate the encryption key K with one of the key generation logics (f and g), which are respectively used in the initial registration and in the additional registration. Thus, even when a third party obtains the vehicle ID and stores the vehicle ID in the memory 42 of the electronic key 2 that is not associated with the immobilizer ECU 6, the unauthentic electronic key would not be registered because key generation logics differ between the initial registration electronic key 2 and the additional registration electronic key 2. This allows for easy registration of the electronic key while ensuring security.

The first embodiment has the advantages described below.

(1) In the key additional registration step, when the vehicle ID is written to the electronic key 2, additional registration of the electronic key 2 is performed. This restricts registration of the electronic key, to which the vehicle ID is not written, to the immobilizer ECU. In the additional key production step, the encryption key K is generated with the second key generation logic g and stored in the additional registration electronic key 2. In the key additional registration step, the encryption key K is generated with the second key generation logic g and stored in the immobilizer ECU 6. Thus, the immobilizer ECU 6 verifies the additional registration electronic key 2. In other words, this restricts registration of the initial registration electronic key 2 to the immobilizer ECU 6 when additionally registering the electronic key 2. This allows for easy registration of the electronic key 2 while ensuring security and eliminating the need to ship the electronic key 2 and the immobilizer ECU 6 together.

(2) In the initial production step, the vehicle ID is stored in the immobilizer ECU 6. In the initial registration step, the vehicle ID from the immobilizer ECU 6 is written to the initial registration electronic key 2. Thus, the electronic key 2 corresponds only to the immobilizer ECU 6 of the vehicle 1, to which the vehicle ID is registered. The electronic key 2 does not correspond to the immobilizer ECU 6 of another vehicle 1, to which the authentic vehicle ID is not registered. This restricts registration of the initial registration electronic key 2 to the immobilizer ECU 6 of another vehicle 1.

(3) In the replacement ECU registration step, when the vehicle ID is written to the electronic key 2, registration of the electronic key 2 is performed. This restricts registration of the electronic key 2, to which the vehicle ID is not written, to the immobilizer ECU 6. In the replacement ECU registration step, the encryption key K is generated with the first key generation logic f, which uses the SEED code stored in the electronic key 2. When verification of the electronic key 2 with the encryption key K is accomplished, the encryption key K is stored in the immobilizer ECU 6. Thus, the replacement immobilizer ECU 6 verifies the initial registration electronic key 2. This allows for registration of the initial registration electronic key 2, which stores the vehicle ID and the encryption key K generated with the first key generation logic f, to the replacement immobilizer ECU 6.

(4) In the replacement ECU registration step, verification (challenge response verification) of the electronic key 2 may fail when the encryption key is generated with the first key generation logic f. This occurs when the electronic key 2 is produced to be additionally registered. In this case, the immobilizer ECU 6 generates the encryption key K with the second key generation logic g, which uses the SEED code stored in the electronic key 2 and the vehicle ID. When verification of the electronic key 2 is accomplished with the encryption key K, which is generated with the second key generation logic g, the encryption key K is stored in the memory 67. Thus, the immobilizer ECU 6 verifies the additional registration electronic key 2. This allows for registration of the additional registration electronic key 2, which stores the vehicle ID and the encryption key K generated with the second key generation logic g, to the immobilizer ECU 6.

(5) The use of the first key generation logic f is inhibited after the initial registration electronic key 2 is registered. This prevents new registration of another electronic key, which uses the same encryption key K as that of the initial registration electronic key 2, to the immobilizer ECU 6.

(6) The vehicle ID, which differs for each vehicle 1, is stored in the immobilizer ECU 6 and the electronic key 2 when shipped from the factory. This inhibits registration of the electronic key 2 to the immobilizer ECU 6 that differs from the order and registration of the electronic key 2 that differs from the order to the immobilizer ECU 6 when being circulated in the market.

Second Embodiment

An electronic key registration system applied to a vehicle according to a second embodiment of the present invention will now be described with reference to FIGS. 1 and 6 to 9. The electronic key registration system of the second embodiment generates the encryption key using the vehicle ID (VID), to which a random number is added, and the encryption key generation code (SC) when generating the encryption key with the second key generation logic g. This point differs from the first embodiment. Here, the description will focus on the differences from the first embodiment. The electronic key registration system of the second embodiment has the same structure as the electronic key registration system 7 of the first embodiment shown in FIG. 1.

A registration operation of the electronic key 2 to the immobilizer ECU 6 performed by the electronic key registration system 7 will now be described. Here, only a case in which the electronic key 2 is additionally registered and a case in which the electronic key 2 is additionally registered to the replacement immobilizer ECU 6 will be described.

Figure 6:
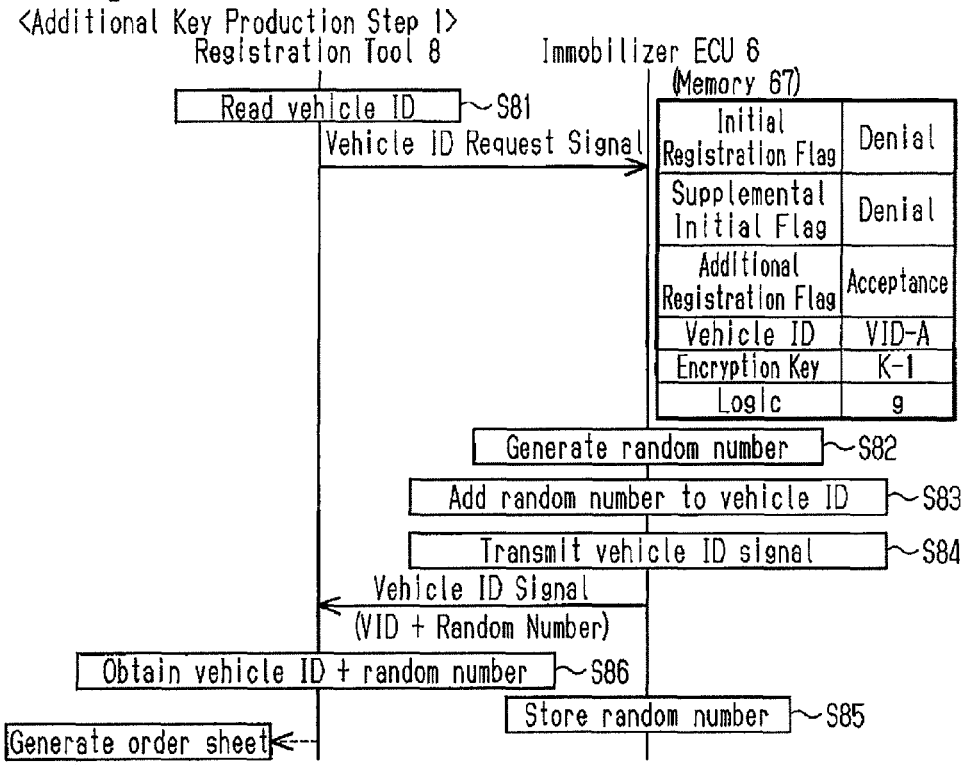
FIG. 6 is a sequence chart showing the acquisition operation of a vehicle ID of the immobilizer ECU when additionally registering the electronic key of the electronic key registration system.

Production of the additional electronic key 2 will now be described with reference to FIGS. 6 and 7. As shown in FIG. 6, in an additional key production step 1, the registration tool 8 is connected to the vehicle 1 to extract the vehicle ID from the immobilizer ECU 6. The memory 67 of the immobilizer ECU 6 installed to the vehicle 1 stores the vehicle ID (VID-A) of the vehicle 1, the encryption key (K-1), and the second key generation logic g. Additionally, in the memory 67, the initial registration flag and the supplemental initial flag are set to a denial state, and the additional registration flag is set to an acceptance state.

When the operation unit 82 is operated by a user, the registration tool 8 transmits a vehicle ID request signal to the immobilizer ECU 6 to read the vehicle ID from the immobilizer ECU 6 (step S81).

When receiving the vehicle ID request signal, the immobilizer ECU 6 generates a random number (step S82). A different random number is generated whenever additional registration is performed. The immobilizer ECU 6 adds the generated random number to the vehicle ID (step S83) and transmits a vehicle ID signal, which includes the vehicle ID (VID-A+random number), to which the random number is added, to the registration tool 8 (step S84). Also, the immobilizer ECU 6 stores the generated random number in the memory 67 (step S85).

When receiving the vehicle ID signal from the immobilizer ECU 6, the registration tool 8 obtains the vehicle ID (VID-A+random number) from the vehicle ID signal (step S86). Then, the registration tool 8 outputs the vehicle ID (VID-A+random number) to a device, which generates an order sheet.

Figure 7:
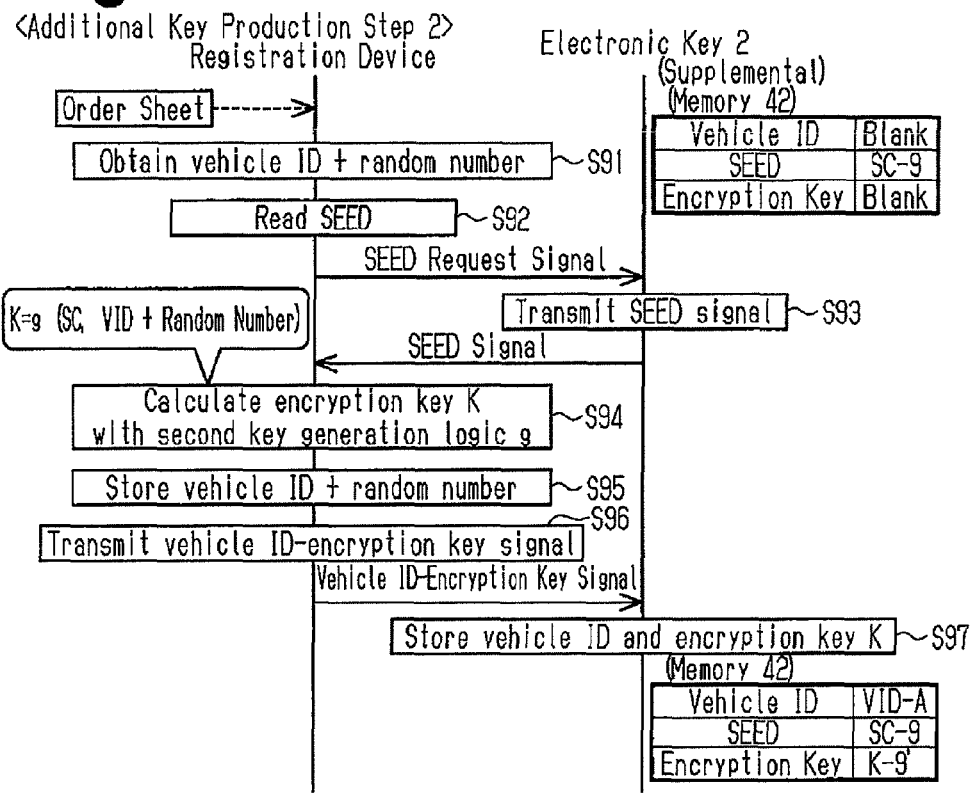
FIG. 7 is a sequence chart showing the registration operation of the additional electronic key of the electronic key registration system.

As shown in FIG. 7, in an additional key production step 2, the memory 42 of the electronic key 2, which is additionally registered to the vehicle 1, stores a SEED code (SV-9) to generate the encryption key. A registration device registers the vehicle ID and the encryption key to the electronic key 2. Any computer may be employed as the registration device. Alternatively, the registration tool 8 may be employed as the registration device.

The registration device obtains the vehicle ID (VID-A+random number), to which the random number is added, from the order sheet (step S91). Then, the registration device transmits a SEED request signal to read the SEED code (step S92).

When receiving the SEED request signal, the electronic key 2 transmits a SEED signal to the registration device (step S93). In the present embodiment, the transponder 4 transmits the SEED signal, which includes the SEED code (SC-9) stored in the memory 42.

The registration device calculates the encryption key (K-9') with the second key generation logic g (step S94). More specifically, the registration device generates the encryption key (K-9') with the second key generation logic g, which uses the vehicle ID (VID-A+random number) obtained from the order sheet and the SEED code (SC-9) read from the electronic key 2. Then, the registration device stores the vehicle ID (VID-A+random number) in the memory 42 (step S95).

Thus, when replacing the immobilizer ECU 6, the vehicle ID (VID-A+random number) is registered to the new immobilizer ECU 6.

The registration device transmits a vehicle ID-encryption key signal, which includes the vehicle ID (VID-A) and the encryption key (K-9'), to the electronic key 2 (step S96). In this case, the registration device transmits the vehicle ID (VID-A) excluding the random number to the electronic key 2.

When receiving the vehicle ID-encryption key signal, the electronic key 2 stores the vehicle ID (VID-A) and the encryption key (K-9') in the memory 42 (step S97). Thus, the memory of the electronic key 2 stores the vehicle ID (VID-A) of the vehicle 1, the SEED code (SC-9), and the encryption key (K-9') in accordance with the order sheet. The encryption key (K-9') is generated with the second key generation logic g, which uses the vehicle ID (VID-A+random number), to which the random number is added, and the SEED code (SC-9). Then the registration tool 8 is connected to the vehicle 1 to perform a registration operation.

Figure 8:
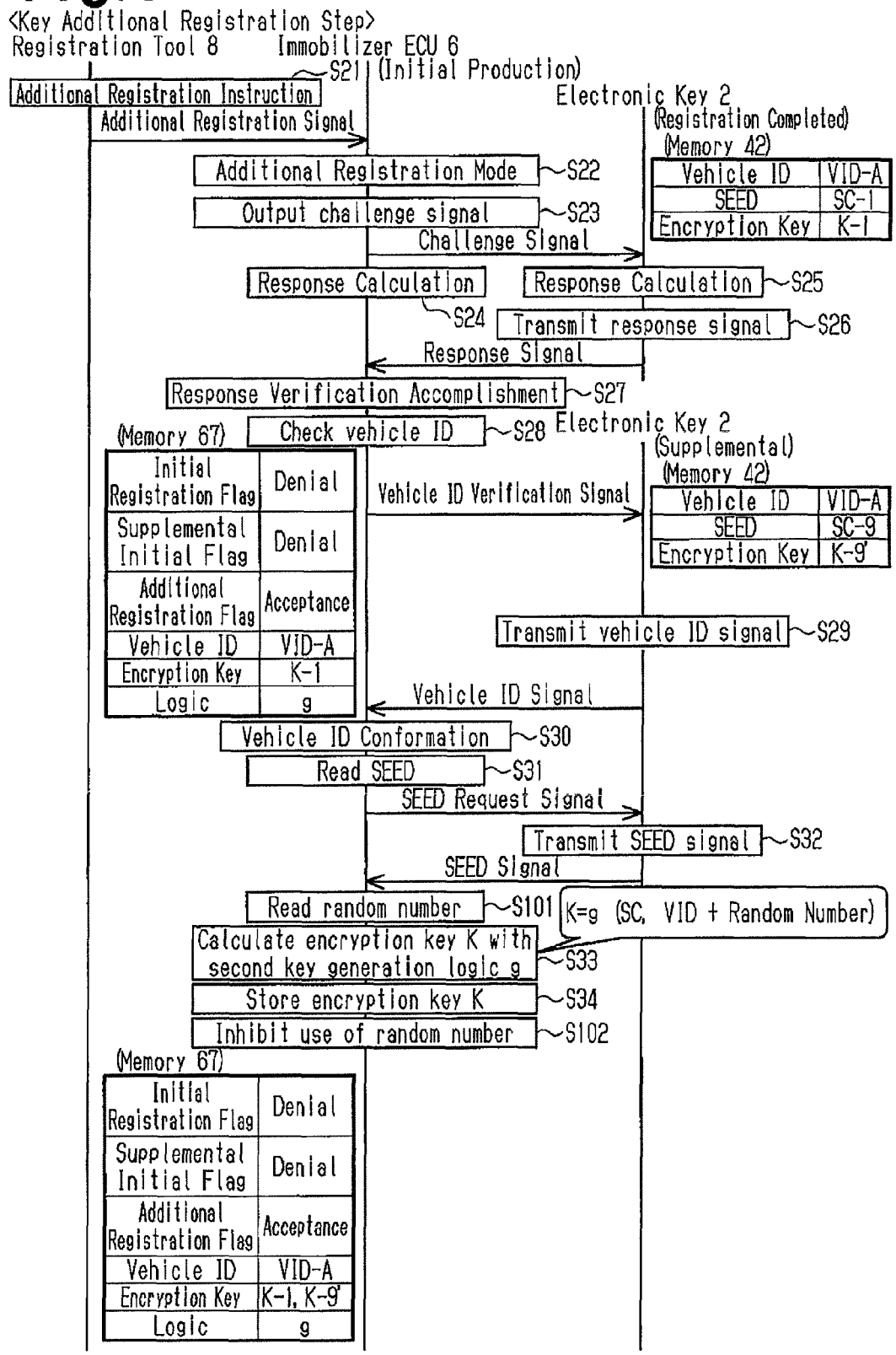
FIG. 8 is a sequence chart showing the additional registration operation of the electronic key of the electronic key registration system.

As shown in FIG. 8, in a key additional registration step, steps S21 to S32 are generally the same as the processing performed in the first embodiment (refer to FIG. 3). Here, steps subsequent to step S32 will be described.

When receiving the SEED signal, the immobilizer ECU 6 reads the random number, which is registered to the registration tool 8, from the memory 67 (step S101). Then, the immobilizer ECU 6 calculates the encryption key (K-9') with the second key generation logic g (step S33). More specifically, first, the SEED reader 64 obtains the SEED code SC-9) from the SEED signal. Then, the encryption key generation unit 65 generates the encryption key (K-9') with the second key generation logic g, which uses the SEED code (SC-9) obtained by the SEED reader 64 and the vehicle ID and the random number stored in the memory 67. Thus, the immobilizer ECU 6 does not directly obtain the encryption key (K-9') from the electronic key 2. The immobilizer ECU 6 obtains the SEED code (SC-9) to generate the encryption key (K-9').

The immobilizer ECU 6 stores the encryption key (K-9') in the memory 67 (step S34). In the present embodiment, the encryption key registration unit 66 stores the encryption key (K-9'), which is generated with the encryption key generation unit 65, in the memory 67. This completes registration of the encryption key (K-9') to the immobilizer ECU 6. The immobilizer ECU 6 performs immobilizer verification of the electronic key 2 using the registered encryption key (K-9'). Then, the immobilizer ECU 6 inhibits use of the used random number (step S102). This prevents additional registration of the electronic key 2 that uses the same random number.

The registration process of the electronic key 2 in the replacement ECU registration step is the same as that of the first embodiment and this will not be described. Also, as shown in FIG. 9, additional registration process of the electronic key 2 in the replacement ECU registration step is the same as that of the first embodiment (refer to FIG. 5). Therefore, steps after step S65 to step S66 will be described. Here, the memory 67 of the immobilizer ECU 6, which is replaced in the replacement ECU production step, stores the same number of the random numbers as that of the additional registration electronic keys 2.

The immobilizer ECU 6 reads the random number, which is output to the registration tool 8 from the previous immobilizer ECU 6, from the memory 67 (step S103). Then, the immobilizer ECU 6 calculates the encryption key (K-9') with the second key generation logic g (step S66). More specifically, the SEED reader 64 first obtains the SEED code (SC-9) from the SEED signal. Then, the encryption key generation unit 65 generates the encryption key (K-9') with the second key generation logic g, which uses the SEED code (SC-9) obtained by the SEED reader 64 and the vehicle ID and the random number stored in the memory 67. Thus, the immobilizer ECU 6 does not directly obtain the encryption key (K-9') from the electronic key 2. The immobilizer ECU 6 obtains the SEED code (SC-9) to generate the encryption key (K-9').

The immobilizer ECU 6 temporarily stores the encryption key (K-9') in the memory 67 (step S67). In the present embodiment, the encryption key registration unit 66 temporarily stores the encryption key (K-9'), which is generated with the encryption key generation unit 65, in the memory 67.

The immobilizer ECU 6 performs the challenge response verification to check whether or not the encryption key (K-9'), which is temporarily stored, is correct. Namely, the immobilizer ECU 6 transmits a challenge signal (step S68). More specifically, the encryption key registration unit 66 transmits the challenge signal, which includes the challenge code, from the coil antenna 5. The encryption key registration unit 66 also calculates a response code using the challenge code and the encryption key (K-9') (step S69). In the same manner, the electronic key 2 calculates a response code using the challenge code and the encryption key (K-9') (step S70). Then, the electronic key 2 transmits the response signal, which is obtained from the response calculation and includes the response code (step S71).

When receiving the response signal, the immobilizer ECU 6 performs the response verification to determine whether or not the two response codes are the same. When the response verification is accomplished (step S72), the immobilizer ECU 6 (encryption key registration unit 66) stores the encryption key (K-9') (step S73). In this manner, the encryption key registration unit 66 stores the encryption key (K-9') in the memory 67 when the response verification is accomplished. This completes registration of the electronic key 2 to the immobilizer ECU 6. This allows for the immobilizer verification between the immobilizer ECU 6 and the electronic key 2 regardless of which the encryption key, (K-1) or (K-9), is stored in the electronic key 2. Subsequently, the immobilizer ECU 6 inhibits use of the used random number (step S104). This prevents additional registration of the electronic key 2 that uses the same random number. When a plurality of the electronic keys 2 are registered to the previous immobilizer ECU 6, a plurality of the random numbers are stored in the memory 67 of the replacement immobilizer ECU 6. In this case, the replacement immobilizer ECU 6 sequentially uses the random numbers stored in the memory 67. When the challenge response is accomplished, the immobilizer ECU 6 sequentially inhibits the use of the random number of the electronic key 2, which is registered to the memory 67.

In the electronic key registration system 7 of the second embodiment, when additionally registering the electronic key 2, the encryption key K is generated with the second key generation logic g, which uses the vehicle ID, to which the random number is added, and the SEED code. Thus, even when a third party obtains the vehicle ID, to which the random number is not added, from the electronic key 2, a different encryption key is not usable. This allows for easy registration of the electronic key 2 while ensuring security.

In addition to the advantages (1) to (6) of the first embodiment, the second embodiment has the advantages described below.

(7) A random number is needed in the key additional registration. Even when the vehicle ID of the vehicle 1, the SEED code, and the second key generation logic g are obtained from the electronic key 2, the encryption key K cannot be generated without the vehicle ID to which the random number is added. This further improves security.

(8) In the replacement ECU registration step, the SEED code is extracted from the electronic key 2, and the encryption key K is generated with the second key generation logic g, which uses the SEED code and the vehicle ID, to which the random number is added. When verification of the electronic key 2 is accomplished by using the generated encryption key K, the encryption key K is stored in the immobilizer ECU 6. Thus, the immobilizer ECU 6 verifies the electronic key 2, which is produced to be additionally registered. This allows for additional registration of the electronic key 2, which stores the vehicle ID and the encryption key K generated with the second key generation logic g, to the immobilizer ECU 6.

(9) The use of the used random number is inhibited after the electronic key 2 is additionally registered. This prevents new registration of another electronic key, which uses the same encryption key K as that of the initial registration electronic key 2, to the immobilizer ECU 6.

The above embodiment may be modified as follows.

In the above embodiment, the use of the first key generation logic f is inhibited subsequent to the initial registration. Instead, the first key generation logic f may be deleted.

In the above embodiment, the use of the first key generation logic f is inhibited subsequent to the initial registration. However, the first key generation logic f may be used subsequent to the initial registration.

In the above embodiment, in the initial registration step and the key additional registration step, the encryption key may be registered after the challenge response verification is performed.

In the above embodiment, the encryption key may be registered without the challenge response verification.

In the replacement ECU registration step of the above embodiment, when the response verification fails (step S61), the immobilizer ECU 6 reacquires the SEED code from the electronic key 2 (steps S64 and S65). The reacquisition of the SEED code may be omitted when using the SEED code previously obtained.

In the replacement ECU registration step of the above embodiment, the encryption key K, which is calculated with the first key generation logic f, is checked with the challenge response verification. Then, when the challenge response verification fails, the encryption key K, which is calculated with the second key generation logic g, is checked with the challenge response verification. Instead, the encryption key K, which is calculated with the second key generation logic g, may be checked with the challenge response verification. Then, when the challenge response verification fails, the encryption key K, which is calculated with the first key generation logic f, is checked with the challenge response verification.

In the second embodiment above, in the additional key production step 2, the SEED code is stored in the memory 42 of the electronic key 2, which is additionally registered to the vehicle 1, in advance. Then, the vehicle ID and the encryption key are registered. Instead, the SEED code, the vehicle ID, and the encryption key may be registered to the memory 42 of the electronic key 2 at the same time.

In the second embodiment above, the use of the random number is inhibited after the encryption key K is registered. Instead, the use of the random number may be inhibited after the encryption key K is calculated.

In the second embodiment above, the use of the random number is inhibited after the encryption key K is registered. Instead, the random number may be deleted. However, the random number is needed in the replacement ECU registration step, in which the immobilizer ECU 6 is replaced. Therefore, in case the random number is deleted, the random number needs to be stored in the memory 42 of the electronic key 2 or be written on the order sheet and stored.

In the second embodiment above, the use of the random number is inhibited after the encryption key is registered. However, the random number may be used after the encryption key K is registered.

In the embodiment above, in the initial registration step and the key additional registration step, the encryption key may be registered after the challenge response verification is performed.

In the above embodiment, the vehicle ID is shown on the display 15 of the vehicle 1 when obtaining the vehicle ID. Instead, when the vehicle 1 undergoes a specific operation that requests for the vehicle ID, the vehicle ID may be transmitted to a mail address specified by a user. This allows only for the user to receive the mail and check the vehicle ID and ensures high confidentiality.

In the above embodiment, the operation of the ignition switch 14 is specified as the initial registration denial operation. However, another operation may be set in lieu of the operation of the ignition switch 14.

In the above embodiment, the present invention is applied to the immobilizer system 3, in which the electronic key 2 is inserted in the key cylinder. Instead, the present invention may be applied to an electronic key system that allows for communication when the electronic key enters a communication area generated by the vehicle 1.

In the above embodiment, the present invention is applied to the electronic key system of the vehicle 1. Instead, the present invention may be applied to an electronic key system of a building such as a house.

The invention claimed is:

1. An electronic key registration method for registering a plurality of electronic keys, which are capable of controlling a communication subject, to a controller of the communication subject, wherein the plurality of electronic keys include a first electronic key, which is initially registered, and a second electronic key, which is additionally registered, the electronic key registration method comprising:
    performing an additional key production process including
        storing, in the second electronic key, identification information unique to the communication subject, an additional encryption key generation code unique to the second electronic key, and an additional encryption key that is used to verify the second electronic key; and
    performing an additional key registration process including
        determining whether or not the identification information is stored in the second electronic key,
        obtaining the additional encryption key generation code and the identification information from the second electronic key when the identification information is determined to be stored in the second electronic key,
        generating the additional encryption key with an additional encryption key generation logic, which is stored in the controller and uses the additional encryption key generation code and the identification information, and
        storing the additional encryption key in the controller.

2. The electronic key registration method according to claim 1, further comprising:
    performing an initial production process including
        storing the identification information in the controller, and
        storing, in the first electronic key, an initial encryption key generation code unique to the first electronic key and an initial encryption key used to verify the first electronic key; and
    performing an initial registration process including
        storing, in the first electronic key, the identification information stored in the controller,
        obtaining the initial encryption key generation code from the first electronic key,
        generating the initial encryption key with an initial encryption key generation logic that uses the initial encryption key generation code, and
        storing the initial encryption key in the controller.

3. The electronic key registration method according to claim 1, further comprising:
    performing a replacement controller production process including storing the identification information in a newly replaced controller; and
    performing a replacement controller registration process including
        obtaining the additional encryption key generation code from the second electronic key and generating the additional encryption key with the additional encryption key generation logic when the identification information is stored in the second electronic key, and
        storing the additional encryption key in the replaced controller when the second electronic key is verified with the additional encryption key.

4. The electronic key registration method according to claim 2, further comprising:
    performing a replacement controller production process including storing the identification information in a newly replaced controller; and
    performing a replacement controller registration process including
        obtaining the initial encryption key generation code from the first electronic key and generating the initial encryption key with the initial encryption key generation logic when the identification information is stored in the first electronic key, and
        storing the initial encryption key in the replaced controller when the first electronic key is verified with the initial encryption key.

5. The electronic key registration method according to claim 4, wherein the performing a replacement controller registration process includes
    temporarily storing the initial encryption key generated with the initial encryption key generation logic in the replaced controller.

6. The electronic key registration method according to claim 4, wherein the performing a replacement controller registration process includes
    discarding the initial encryption key generated with the initial encryption key generation logic when the second electronic key is not verified with the initial encryption key,
    obtaining the additional encryption key generation code from the second electronic key and generating the additional encryption key with the additional encryption key generation logic when the identification information is stored in the second electronic key,
    temporarily storing the additional encryption key, which is generated with the additional encryption key generation logic, in the replaced controller, and
    storing the additional encryption key in the replaced controller when the second electronic key is verified with the additional encryption key.

7. The electronic key registration method according to claim 1, wherein:
the performing an additional key production process includes
adding a random number to the identification information, and
storing, in the second electronic key, the additional encryption key generated with the additional encryption key generation logic, wherein the additional encryption key generation logic uses the identification information, to which the random number is added, and the additional encryption key generation code; and
the performing an additional key registration process includes
obtaining the additional encryption key generation code from the second electronic key when the identification information is stored in the second electronic key,
generating the additional encryption key with the additional encryption key generation logic, wherein the additional encryption key generation logic uses the identification information, to which the random number is added, and the additional encryption key generation code, and
storing the additional encryption key in the controller.

8. The electronic key registration method according to claim 4, wherein:
the performing an additional key production process includes
adding a random number to the identification information, and
storing, in the second electronic key, the additional encryption key generated with the additional encryption key generation logic, wherein the additional encryption key generation logic uses the identification information, to which the random number is added, and the additional encryption key generation code;
the performing a replacement controller production process includes storing the random number in the replaced controller; and
the performing a replacement controller registration process includes
discarding the initial encryption key generated with the initial encryption key generation logic when the second electronic key is not verified with the initial encryption key,
obtaining the additional encryption key generation code from the second electronic key when the identification information is stored in the second electronic key,
generating the additional encryption key with the additional encryption key generation logic, wherein the additional encryption key generation logic uses the identification information, to which the random number is added, and the additional encryption key generation code,
temporarily storing the additional encryption key in the replaced controller, and
storing the additional encryption key in the replaced controller when the second electronic key is verified with the additional encryption key.

9. The electronic key registration method according to claim 7, wherein the controller inhibits the use of the random number that has been used to generate the additional encryption key.

10. The electronic key registration method according to claim 2, wherein the controller inhibits the use of the initial encryption key generation logic that has been used to generate the initial encryption key.

11. The electronic key registration method according to claim 3, wherein
based on order information generated by checking the identification information that is set in advance for the communication subject, identification information that differs for each communication subject is stored in the replaced controller and the second electronic key prior to shipment.

12. An electronic key registration system comprising:
a controller located in a communication subject; and
first and second electronic keys capable of controlling the communication subject, wherein
the first electronic key is configured to store identification information unique to the communication subject, a first encryption key generation code unique to the first electronic key, and a first encryption key,
the second electronic key is configured to store the identification information, a second encryption key generation code unique to the second electronic key, and a second encryption key, and
the controller is configured to
obtain the first encryption key generation code from the first electronic key,
generate the first encryption key with a first encryption key generation logic that is stored in the controller and uses the first encryption key generation code,
verify the first electronic key with the first encryption key to register the first encryption key,
determine whether or not the identification information is stored in the second electronic key,
obtain the identification information and the second encryption key generation code from the second electronic key when the identification information is determined to be stored in the second electronic key,
generate the second encryption key with a second encryption key generation logic that is stored in the controller and uses the identification information and the second encryption key generation code, and
verify the second electronic key with the second encryption key to register the second electronic key.

* * * * *